Figure 1:
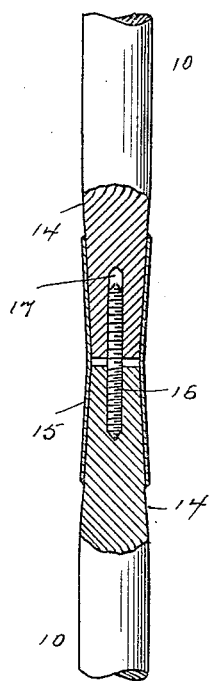

No. 841,336. PATENTED JAN. 15, 1907.
S. A. NORTH.
GUN CLEANING ROD.
APPLICATION FILED JUNE 2, 1906.

WITNESSES
H. A. Lamb
S. W. Atherton

INVENTOR
Samuel A. North
BY
A. W. Wooster
ATTORNEY

UNITED STATES PATENT OFFICE.

SAMUEL A. NORTH, OF BRIDGEPORT, CONNECTICUT, ASSIGNOR TO BRIDGEPORT GUN IMPLEMENT COMPANY, OF BRIDGEPORT, CONNECTICUT, A CORPORATION OF CONNECTICUT.

GUN-CLEANING ROD.

No. 841,336.    Specification of Letters Patent.    Patented Jan. 15, 1907.

Application filed June 2, 1906. Serial No. 319,914.

*To all whom it may concern:*

Be it known that I, SAMUEL A. NORTH, a citizen of the United States, residing at Bridgeport, county of Fairfield, State of Connecticut, have invented a new and useful Gun-Cleaning Rod, of which the following is a specification.

This invention relates to jointed rods generally, and is especially adapted to sectional gun-cleaning rods; and the object of the invention is to produce a sectional or jointed rod which shall consist of few parts, all easy to make, which shall be fully as strong at the joints as are the sections themselves, which shall be perfectly tight when put together and will not rattle or become loose, and which shall be so constructed that the joining-sleeves will not come in contact with the inner wall of a gun-barrel in use.

With these and other objects in view I have devised the novel sectional rod of which the following description, in connection with the accompanying drawings, is a specification, reference characters being used to indicate the several parts.

Figure 2:
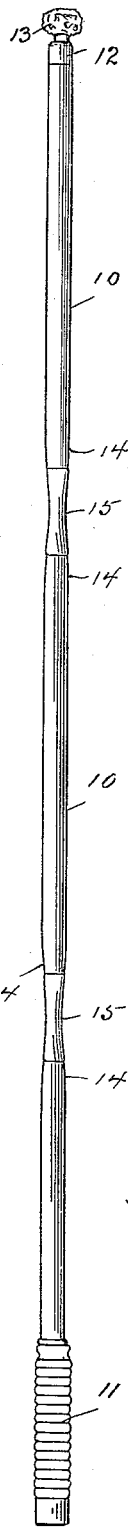
Figure 3:
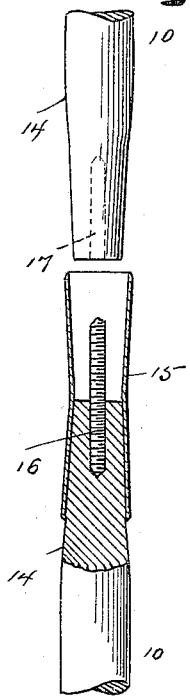

Figure 1 is an elevation of a sectional gun-cleaning rod connected together and ready for use; Fig. 2, a sectional view of one of the joints on an enlarged scale; and Fig. 3 is a similar view, one of the sections being detached.

10 denotes the sections, which are made of wood, one of which may be provided with a handle 11 for convenience in use and another of which is provided with a head 12, adapted to receive a swab, wiper, brush, or any other cleaning-tool, (indicated by 13.)

The novelty of the present invention lies in the joints. The connecting ends of the sections taper, as at 14.

15 denotes double-tapering sleeves which receive the tapering ends of the sections, the sleeves being of greatest diameter at their ends and of least diameter at their midlength. It should be noted that the diameter of the sleeves at their ends is slightly less than the normal diameter of the sections, so that the sleeves will not come in contact with the inner wall of a gun-barrel. This renders it impossible for any of the metal of the sleeves to be scraped off within a gun-barrel.

The sections are securely locked together by means of double-ended screws 16, which engage central holes 17 in the contiguous ends of the sections, as clearly shown. When assembled, the contiguous ends of the sections do not quite abut, but remain separated, and one or both of the holes 17 are ordinarily made slightly deeper than the length of the corresponding portion of the double-ended screw, so that the sections may be easily tightened up should the wood shrink in use.

In joining the sections together the screw is started into the longitudinal hole in the end of one of the sections—for example, the handle end. Then a sleeve is placed over the taper, and then the connecting end of another section is placed in the other end of the sleeve and in engagement with the screw, and the sections are rotated in opposite directions until the ends of the two sections fit the tapering ends of the sleeve closely, so that a perfectly rigid and tight joint is formed which is fully equal in strength to the strength of the sections themselves.

Having thus described my invention, I claim—

1. A rod comprising sections having tapering ends, a double-tapering sleeve which receives the ends of the sections and a double-ended screw engaging the ends of the sections.

2. A rod comprising sections having tapering ends, a double-tapering sleeve of greatest diameter at the ends and whose greatest diameter is slightly less than the diameter of the sections, for the purpose set forth, and a double-ended screw engaging the ends of the sections.

3. A rod comprising sections having tapering ends, a double-tapering sleeve which receives the ends of the sections and a double-ended screw engaging holes in the ends of the sections, the sleeve fitting the ends of the sections closely and said sections remaining slightly separated.

4. A rod comprising sections having tapering ends, a double-tapering sleeve which receives the ends of the sections and a double-ended screw engaging holes in the ends of the sections, one of said holes being slightly deeper than the length of the corresponding portion of the screw, substantially as described, for the purpose specified.

In testimony whereof I affix my signature in presence of two witnesses.

SAMUEL A. NORTH.

Witnesses:
 A. M. WOOSTER,
 S. W. ATHERTON.